US008171973B2

(12) United States Patent
Ganzer et al.

(10) Patent No.: US 8,171,973 B2
(45) Date of Patent: May 8, 2012

(54) NOZZLE AND RELATED APPARATUS AND METHOD FOR DISPENSING MOLTEN THERMOPLASTIC MATERIAL

(75) Inventors: Charles P. Ganzer, Cumming, GA (US); Edward C. Taylor, Cumming, GA (US); Leslie J. Varga, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 43 days.

(21) Appl. No.: 12/021,547

(22) Filed: Jan. 29, 2008

(65) Prior Publication Data

US 2009/0188604 A1 Jul. 30, 2009

(51) Int. Cl.
*B29C 47/12* (2006.01)

(52) U.S. Cl. .................. 156/500; 156/244.11; 156/578; 425/192 R; 425/380; 425/464; 222/478; 222/525; 118/315

(58) Field of Classification Search .................. 156/575, 156/578, 500, 244.11; 222/330, 552, 568, 222/420, 540, 478, 575, 565; 425/464, 466, 425/382.4, 382 R, 381, 287, 87, 382.2, 467, 425/288, 192 R, 192 S, 380; 53/133.2; 118/315; 239/552; 249/102
See application file for complete search history.

(56) References Cited

U.S. PATENT DOCUMENTS

| | | | | |
|---|---|---|---|---|
| 1,453,048 | A * | 4/1923 | Kraft et al. | 425/464 |
| 1,946,339 | A | 2/1934 | Vigers et al. | |
| 2,211,946 | A * | 8/1940 | Graves | 425/464 |
| 2,373,892 | A * | 4/1945 | Hickey | 264/177.13 |
| 2,408,713 | A * | 10/1946 | Webb | 425/464 |
| 2,414,873 | A | 1/1947 | Herbst | |
| 2,697,446 | A | 12/1954 | Harrington | |
| 2,957,489 | A | 10/1960 | Fisher | |
| 3,016,568 | A * | 1/1962 | Gagne | 425/191 |
| 3,126,574 | A | 3/1964 | Fox | |
| 3,152,923 | A | 10/1964 | Marshall et al. | |
| 3,327,680 | A | 6/1967 | Talbot | |
| 3,432,886 | A * | 3/1969 | Haley | 425/380 |
| 3,570,725 | A | 3/1971 | Baker et al. | |
| 3,788,561 | A | 1/1974 | Vilagi et al. | |
| 3,840,158 | A | 10/1974 | Baker et al. | |
| 3,849,241 | A | 11/1974 | Butin et al. | |
| 3,912,240 | A * | 10/1975 | Smith et al. | 425/380 |
| 4,059,373 | A * | 11/1977 | Maier | 425/192 R |
| 4,220,114 | A | 9/1980 | Radowicz | |

(Continued)

FOREIGN PATENT DOCUMENTS

FR 2205831 5/1974

(Continued)

OTHER PUBLICATIONS

Giles, H.F., Wagner, J.R., and E.M. Mount, Extrusion: The Definitive Processing Guide and Handbook, William Andrew Publishing, 2005, pp. 13-22 and 497-503.*

(Continued)

*Primary Examiner* — Philip Tucker
*Assistant Examiner* — William Bell
(74) *Attorney, Agent, or Firm* — Wood, Herron & Evans, L.L.P.

(57) ABSTRACT

A nozzle for dispensing molten thermoplastic material includes non-circular outlets spaced apart from one another in a predetermined pattern. The nozzle may be used to dispense patterns of adhesive that form closed geometric shapes, such as for use in making hermetic seals.

18 Claims, 10 Drawing Sheets

U.S. PATENT DOCUMENTS

| | | | | |
|---|---|---|---|---|
| 4,276,011 | A * | 6/1981 | Siegman et al. | 425/198 |
| 4,324,816 | A | 4/1982 | Landis et al. | |
| 4,386,998 | A | 6/1983 | McIntyre et al. | |
| 4,457,685 | A * | 7/1984 | Huang et al. | 425/461 |
| 4,516,702 | A | 5/1985 | Schmidt | |
| 4,516,926 | A * | 5/1985 | Yip | 425/464 |
| 4,534,388 | A | 8/1985 | Pall et al. | |
| 4,550,681 | A | 11/1985 | Zimmer et al. | |
| 4,572,435 | A | 2/1986 | Thompson | |
| 4,618,101 | A | 10/1986 | Piggott | |
| 4,675,208 | A | 6/1987 | Kageyama et al. | |
| 4,687,137 | A | 8/1987 | Boger et al. | |
| 4,735,169 | A | 4/1988 | Cawston et al. | |
| 4,774,109 | A | 9/1988 | Hadzimihalis et al. | |
| 4,798,163 | A | 1/1989 | Claassen | |
| 5,024,709 | A | 6/1991 | Faulkner, III et al. | |
| 5,027,976 | A | 7/1991 | Scholl et al. | |
| 5,073,102 | A * | 12/1991 | Guggiari | 425/461 |
| 5,078,168 | A | 1/1992 | Konieczynski | |
| 5,162,121 | A | 11/1992 | Kawaguchi et al. | |
| 5,335,825 | A | 8/1994 | Fort | |
| 5,423,889 | A | 6/1995 | Colquitt et al. | |
| 5,489,928 | A | 2/1996 | Takahashi et al. | |
| 5,624,528 | A * | 4/1997 | Abrams et al. | 156/556 |
| 5,728,219 | A * | 3/1998 | Allen et al. | 118/315 |
| 5,733,597 | A | 3/1998 | Schmitkons et al. | |
| 5,934,520 | A | 8/1999 | Byerly et al. | |
| 6,056,155 | A | 5/2000 | Byerly et al. | |
| 6,474,566 | B1 | 11/2002 | Hirota et al. | |
| 6,602,382 | B1 | 8/2003 | Matsuyama et al. | |
| 6,688,580 | B2 | 2/2004 | Jackson et al. | |
| 2002/0014201 | A1 | 2/2002 | Holmstrom | |
| 2003/0041963 | A1 | 3/2003 | Gong et al. | |
| 2004/0163768 | A1 | 8/2004 | Nowicki et al. | |
| 2004/0217202 | A1 | 11/2004 | Hynes | |
| 2008/0073028 | A1 * | 3/2008 | Yu et al. | 156/289 |

FOREIGN PATENT DOCUMENTS

WO WO 2005123527 A1 * 12/2005

OTHER PUBLICATIONS

Nordson Corporation, Series E-350 Electric Guns, Brochure, 1997 (2 pgs.).

Nordson Corporation, Series 700 Electric Guns, Brochure 1996 (2 pgs.).

Nordson Corporation, Speed-Coat Slot Applicator, Brochure 2003 (2 pgs.).

European Patent Office, Search Report in European Patent Application 05025150, Mar. 21, 2006 (10 pgs.).

Nordson Corporation, Nordson Drawing No. 803070, May 6, 1980 (1 pg.).

Nordson Corporation, Nordson Drawing No. 803083, May 19, 1980 (1 pg.).

Slautterback Corporation, MultiLine Extrusion Applicators ML 400 Series, Slautterback Corporation Technical Bulletin TB033, revised Jul. 20, 1990 (1 pg.).

Nordson Corporation, New Multi-Orifice Nozzle, The Melting Pot, internal publication of Nordson Corporation, Amherst, Ohio, vol. 2, Issue 1, p. 4 (Jan. 1981).

Acumeter Laboratories, Wide Band Extrusion Nozzles, Brochure, May 1983 (4 pgs.).

Nordson Corporation, Multi-Line Nozzles, a page from Technical Bulletin, p. 30, Oct. 1986.

Slautterback Corporation, Multiline Extrusion Applicators ML 400 Series, from a Technical Bulletin of Slautterback Corporation, revised Mar. 1, 1990 (2 pgs.).

* cited by examiner

NOZZLE AND RELATED APPARATUS AND METHOD FOR DISPENSING MOLTEN THERMOPLASTIC MATERIAL

FIELD OF THE INVENTION

The present invention relates generally to the dispensing of viscous liquids and, more particularly, to nozzle assemblies for dispensers of molten thermoplastic material such as hot melt adhesive.

BACKGROUND

Various dispensing systems have been used for applying molten thermoplastic material, such as hot melt adhesives, onto a moving or stationary substrate. In the production of liquid containers, such as juice cartons, hot melt adhesive systems have been developed to apply hot melt adhesive to the mounting flange of the carton cap to bond and seal the non-removable portion of the cap to the carton. In this application, the hot melt adhesive must be applied in a pattern that includes a continuous, i.e., unbroken, outer perimeter to hermetically seal the non-removable portion of the cap to prevent contamination of juice or other liquid within the carton or container when the cap is closed and to prevent spillage when the cap is open and the liquid is poured from the container. The pattern of the dispensed adhesive may have a round or other pattern, depending upon the shape of the cap.

Typically, the dispenser is mounted above a moving conveyor or other device carrying the caps, with the hot melt adhesive dispensed onto the mounting flanges of the caps. One conventional system has utilized a dispenser having a single orifice, with the dispenser mounted on a dedicated automation device capable of moving the dispenser as required to create the desired adhesive pattern on the flange as it moves past the dispenser. The production line speed may be very high, for example, the dispenser may be required to dispense adhesive onto the cap flanges at a rate of 2/sec. As may be appreciated, complex and expensive dedicated automation devices, such as robots, are required to move the dispenser fast enough to achieve the desired pattern of applied adhesive in view of the high production line speed. To prevent an undesirable and costly reduction in line speed, conventional systems have used multiple dispensers, each mounted on separate robot heads. This adds cost to the dispensing system.

Other challenges associated with hot melt adhesive dispensing systems include the prevention of discharge orifice clogging that may potentially occur due to the presence of charred particles of adhesive or other contaminants within the dispensing system and the creation of acceptable line quality. The deposition of hot melt adhesive must be the correct amount within fairly tight tolerances in many applications including the "carton cap" application discussed previously. If insufficient adhesive is deposited, the carton cap may leak. If too much adhesive is deposited, there may be an undesirable "squeeze-out" of material around the edges of the cap. As part of the design process of sizing discharge orifices, the following tradeoffs must be assessed. For a given amount of adhesive at a particular application pressure, smaller orifices result in higher velocities which can contribute to better "cutoff". This helps eliminate any undesirable "stringing" of the material that may otherwise occur and adversely affect the quality of the pattern of dispensed adhesive. However, relatively smaller orifices are more susceptible to clogging as a result of any charred particles or other contaminants that may be flowing through the system. Relatively larger orifices help minimize the chance of orifice clogging, but the challenge with relatively larger orifices is to maintain sufficiently high pressure to maintain an acceptable cutoff velocity while keeping the pressure low enough to avoid the deposition of excess adhesive.

SUMMARY

In one embodiment, a nozzle is provided for dispensing molten thermoplastic material. The nozzle includes a body with a fluid supply passage, and a nozzle plate. The nozzle plate includes a peripheral surface and a downstream surface with at least a portion of the peripheral surface being disposed in contacting engagement with the body. A plenum is defined by the body and the nozzle plate and is in fluid communication with the fluid supply passage. A plurality of spaced fluid discharge passages communicates with the plenum and each fluid discharge passage includes a non-circular outlet. The non-circular outlets extend through the downstream surface and are spaced apart from one another in a predetermined pattern.

In another aspect, a nozzle is provided and includes a nozzle body and a plurality of spaced fluid discharge passages at least partially defined by the nozzle body. The fluid discharge passages are adapted to communicate with a supply of molten thermoplastic material in a dispenser. Each of the fluid discharge passages has a non-circular outlet and these outlets are spaced apart from one another in a predetermined pattern configured to form the molten thermoplastic material into a closed geometric shape after discharge from the outlets.

In other aspects, the non-circular outlets may comprise various shapes, such as generally rectangular or rectangular slots, or combinations of shapes. For example, slots or outlets of various shapes may be desirable when producing overall patterns of thermoplastic material in various shapes. The patterns themselves may have various shapes such as square, circular or round, or any other shapes that are generally referred to herein as geometric shapes, although the shapes may or may not be common geometric forms. These shapes may have one or more curved sides and/or one or more straight sides. The outlets may be contained in a single plane or may comprise a three-dimensional configuration.

A method for securing a workpiece to a substrate is also provided and includes supplying molten thermoplastic material to a plenum between a body of a nozzle and a nozzle plate. The molten thermoplastic material is distributed from the plenum to a plurality of peripherally spaced fluid discharge passages defined by the nozzle plate and the body. The molten thermoplastic material is dispensed onto the workpiece from non-circular outlets of the fluid discharge passages. A continuous, unbroken line of the dispensed thermoplastic material is formed on the workpiece, and the workpiece is adhered to the substrate with the molten thermoplastic material.

The thermoplastic material may or may not be simultaneously dispensed from all of the non-circular outlets. The method may further comprise dispensing the material onto a portion of a cap assembly and then adhering the portion of the cap assembly to a container. For workpieces having a surface defined in a single plane for receiving the molten thermoplastic material, the molten thermoplastic material is dispensed onto that single plane. For more complex configurations involving three-dimensional surfaces for receiving the material, the material is dispensed along a line forming a multi-planar shape.

In another aspect, the method includes distributing the material to a plurality of peripherally spaced fluid discharge passages of the nozzle. The material is dispensed onto the workpiece from non-circular outlets of the fluid discharge passages. A continuous, unbroken line of the dispensed material is formed on the workpiece into a closed geometric shape. The workpiece is adhered to the substrate with the molten thermoplastic material. The closed geometric shape of the material may or may not be used to create a hermetic seal.

Various additional advantages and features of the invention will become readily apparent to those of ordinary skill in the art upon review of the following detailed description of the illustrative embodiments taken in conjunction with the accompanying drawings.

BRIEF DESCRIPTION OF THE DRAWINGS

The present invention will become better understood with regard to the following description, appended claims and accompanying drawings of illustrated embodiments in the invention wherein:

DETAILED DESCRIPTION

Figure 1:
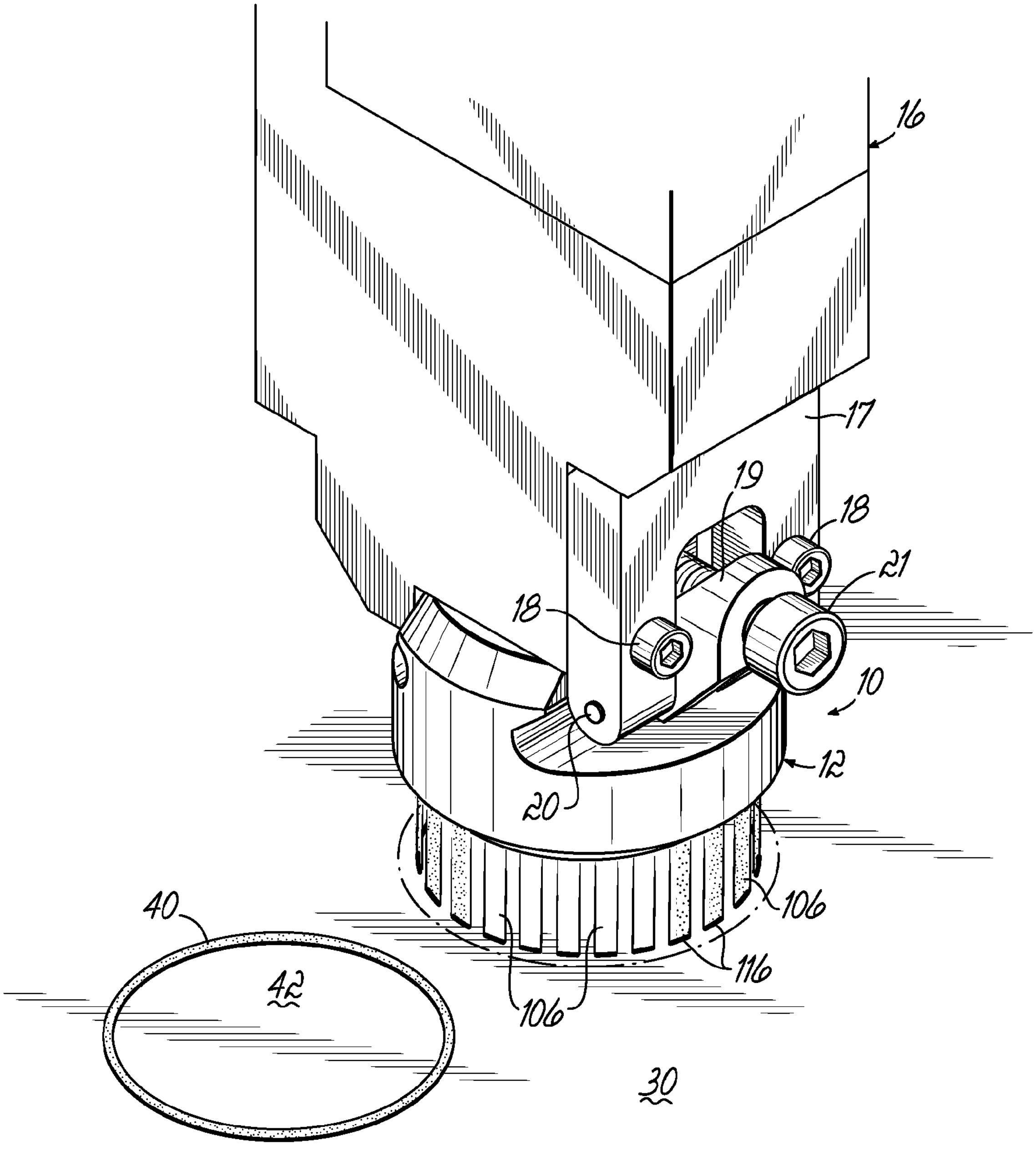
FIG. 1 is a perspective view of a nozzle assembly according to an illustrative embodiment of the present invention releasably mounted to a dispenser of molten thermoplastic material.
Figure 2:
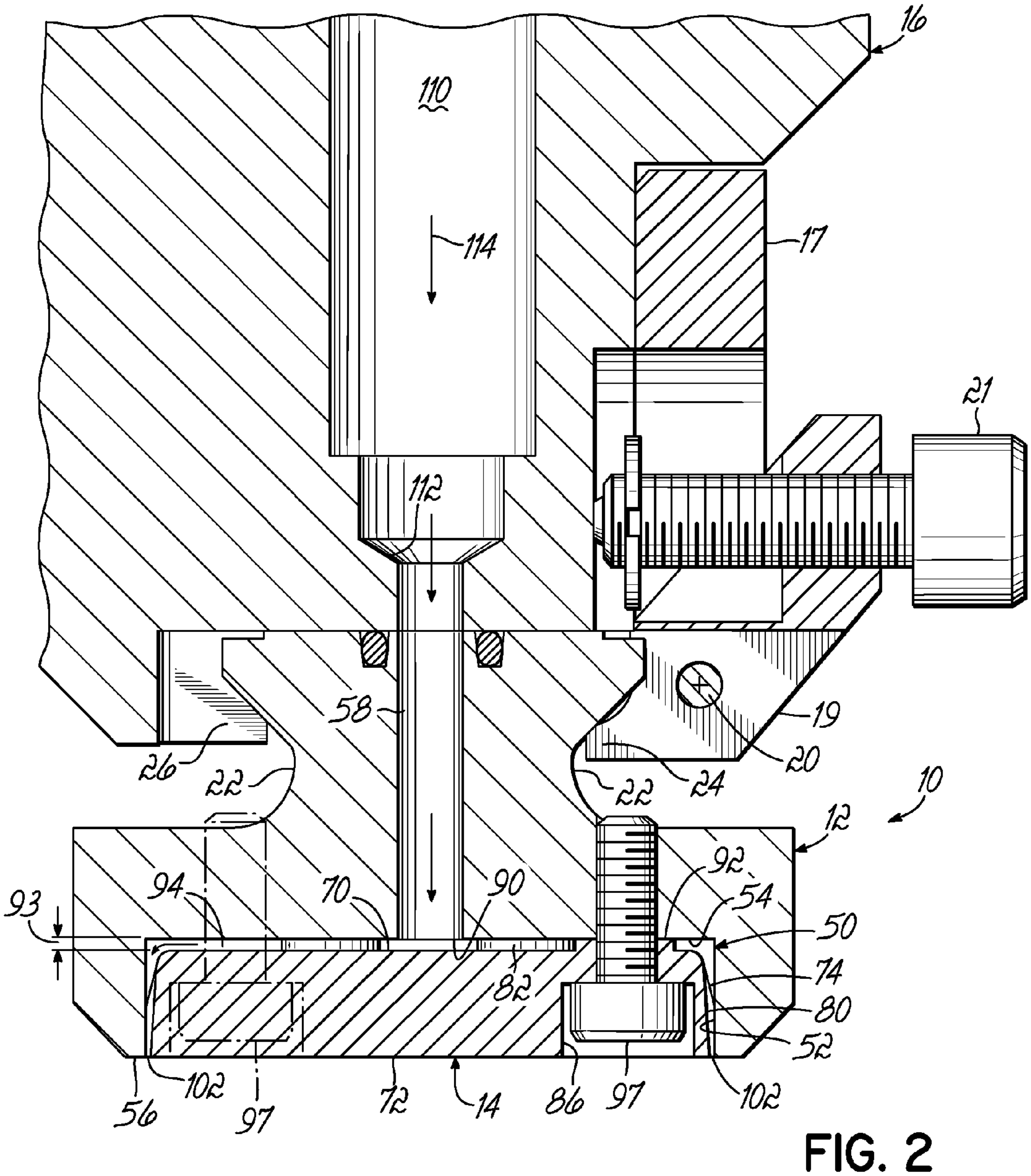
FIG. 2 is a cross-sectional view of the nozzle assembly and a portion of the dispenser illustrated in FIG. 1.

FIGS. 1-4 and 4A illustrate a nozzle constructed as an assembly 10 according to one embodiment of the present invention. Nozzle assembly 10 includes a body 12 and a nozzle plate 14 that is engaged with body 12 as subsequently discussed. As shown in FIGS. 1 and 2, the nozzle assembly 10 may be releasably mounted to a dispenser 16, for example, by using a mount device having a yoke 17 secured to dispenser 16 by bolts 18, and a clamp block 19. The clamp block 19 may be pivotally mounted to the yoke 17 by a pivot pin 20. A conventional fastener, such as screw 21 may be used to releasably secure clamp block 19 to body 12 of assembly 10 and to disengage clamp block 19 from body 12. Body 12 of nozzle assembly 10 may include a pair of recesses 22 formed therein on opposite sides of body 12. A lower portion 24 of clamp block 19 may engage one of the recesses 22 and a lower portion 26 of dispenser 16 may engage the other recess 22. However, nozzle assembly 10 may be otherwise releasably secured to the dispenser 16.

Dispenser 16 may be any suitable dispenser. The illustrative dispenser 16 includes a valve (not shown) that may be pneumatically or electrically operated. The valve may be a stand-alone module or a cartridge. An example of a suitable valve that may be used is the valve included in the ClassicBlue™ hot melt adhesive module commercially available from Nordson Corporation of Westlake, Ohio, which is the assignee of the invention.

Together, nozzle assembly 10 and dispenser 16 may be used to dispense molten thermoplastic material, such as a hot melt adhesive, onto a workpiece, such as workpiece 30 illustrated in FIG. 1. The workpiece 30 may then be adhesively secured to a substrate. For example, the workpiece can be a portion of a cap assembly, and the substrate may be a container. Nozzle assembly 10 and dispenser 16 may be used in a wide variety of applications and, accordingly, workpiece 30 may be a wide variety of articles of manufacture. More specifically, in one application, workpiece 30 may be a non-removable cap flange of a beverage container. As subsequently discussed in further detail, the molten thermoplastic material may be dispensed from nozzle assembly 10 to create a continuous, unbroken line 40 of adhesive that forms a closed geometric shape and completely surrounds an area 42 of the workpiece 30, with area 42 having any desired shape. In the embodiment illustrated in FIGS. 1-4 and 4A, area 42 has a circular shape. The continuous unbroken line 40 of thermoplastic material may be used to create a hermetic seal.

Body 12 of the nozzle assembly 10 includes a recess 50 formed therein that defines an inner peripheral surface 52 and a confronting surface 54 of body 12. In the illustrative embodiment shown in FIGS. 1-4 and 4A, recess 50 is a circular bore and accordingly, the inner peripheral surface 52 is cylindrical and confronting surface 54 is round. However, the recess formed in body 12 may have any other shape, with illustrative and non-limiting examples of alternative shapes discussed subsequently. The inner peripheral surface 52 of body 12 extends between a downstream surface 56 of body 12 and the confronting surface 54 as shown in FIG. 2. Body 12 further includes a fluid supply passage 58 formed therein that is in fluid communication with a fluid discharge passage 60 of dispenser 16.

Nozzle plate 14 has an upstream surface 70, a downstream surface 72 and a peripheral surface 74 that extends between the upstream 70 and downstream 72 surfaces. The shape of the inner peripheral surface 52 of body 12 is complementary to the shape of the peripheral surface 74 of nozzle plate 14. The peripheral surface 74 of nozzle plate 14 includes a downstream portion 76 and an upstream portion 78. A plurality of peripherally spaced grooves 80 are formed in nozzle plate 14 and extend inwardly from the peripheral surface 74. A plurality of spaced standoffs 82, each having a hollow interior 84, extend in an upstream direction from the upstream surface 70 of nozzle plate 14. Nozzle plate 14 also includes a plurality of stepped bores 86, having a like number as the number of standoffs 82.

Figure 2A:
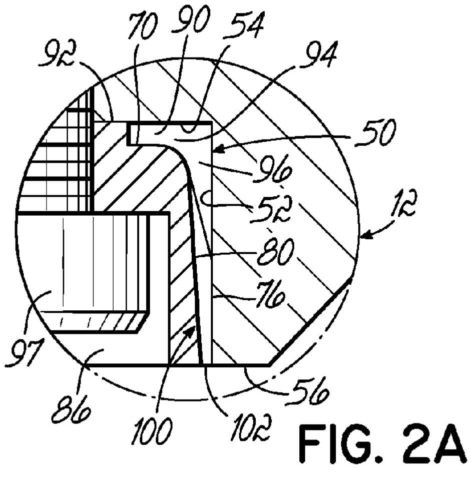
FIG. 2A is an enlarged view of a portion of FIG. 2.
Figure 3:
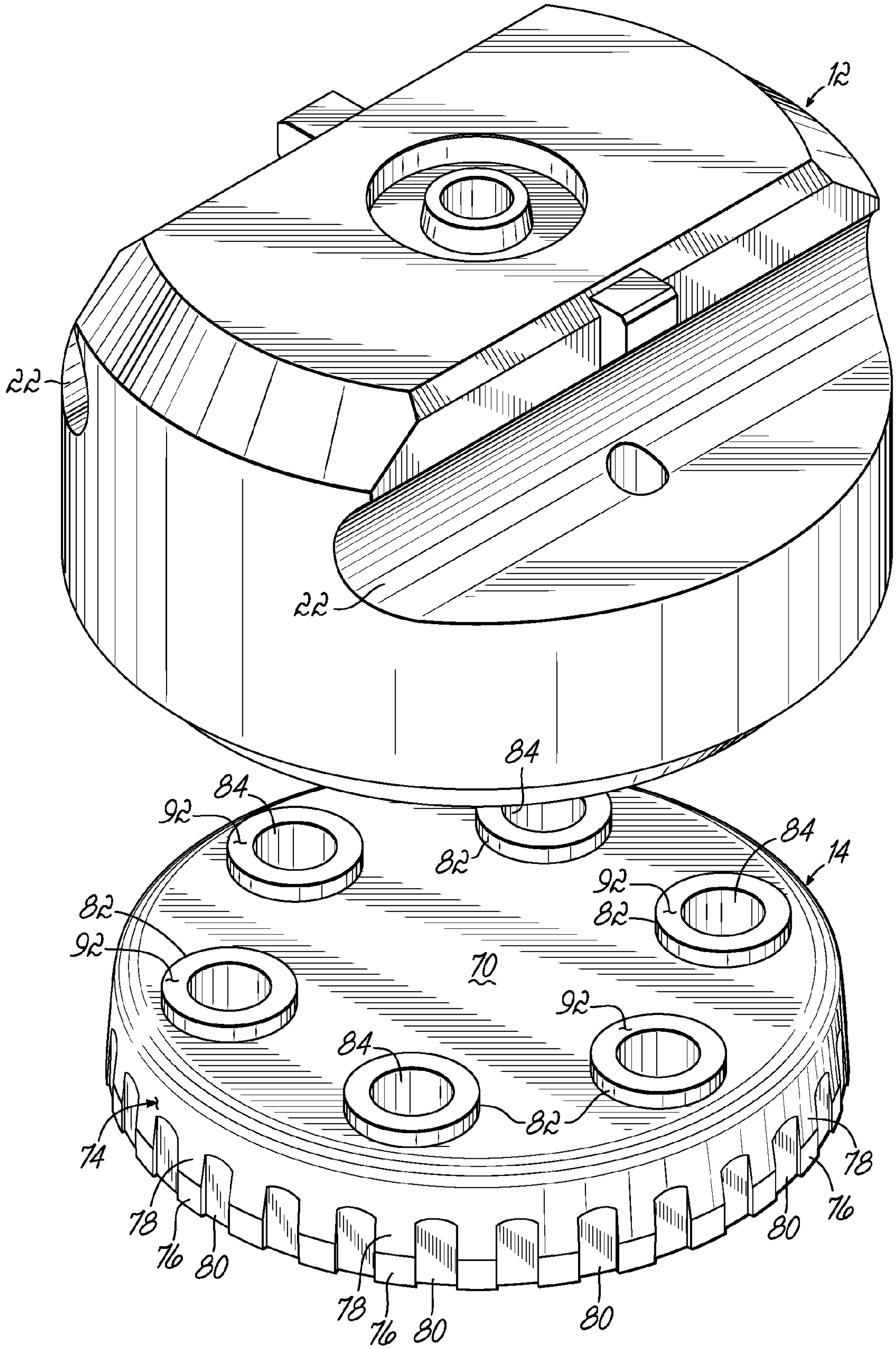
FIG. 3 is an exploded assembly, perspective view of the nozzle assembly shown in FIGS. 1 and 2.
Figure 4:
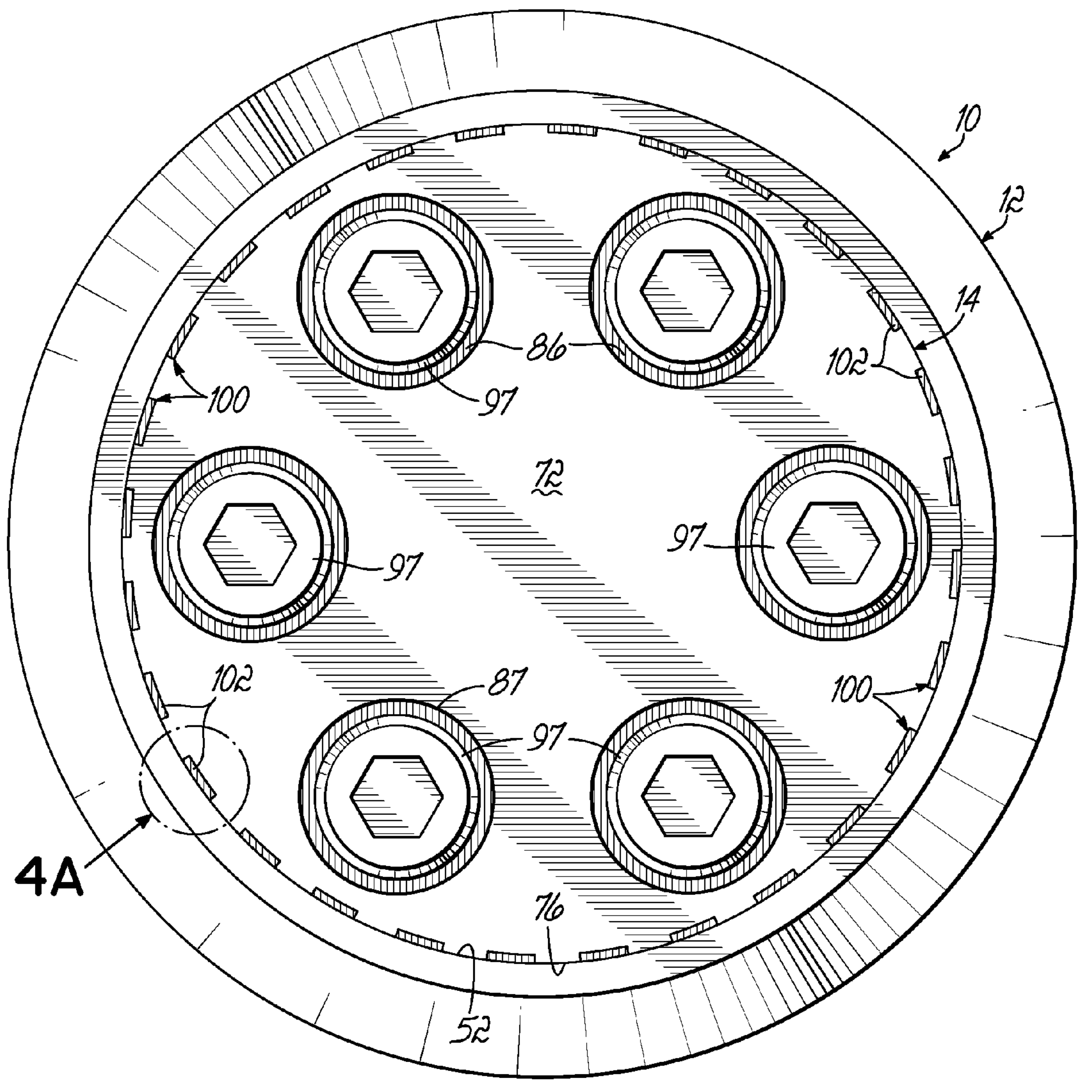
FIG. 4 is a bottom plan view of the nozzle assembly shown in FIGS. 1-3.

With reference to FIGS. 2, 2A and 4, nozzle plate 14 is disposed within the recess 50 of body 12, with at least a portion of the peripheral surface 74 engaging the inner peripheral surface 52 of body 12. In the illustrative embodiment shown in FIGS. 1-4 and 4A, the downstream portion 76 of peripheral surface 74 of nozzle plate 14 has the same cylindrical shape as the inner peripheral surface 52 of body 12 and engages surface 52 in a press fit. Together, nozzle plate 14 and body 12 define a plenum 90. The upstream surface 70 of nozzle plate 14 faces the confronting surface 54 of body 12 and an upstream surface 92 of standoffs 82 are disposed in contacting engagement with the confronting surface 54 of body 12. Accordingly, the height of standoffs 82 establish a height 93 of a portion 94 of plenum 90 that extends between the upstream surface 70 of nozzle plate 14 and the confronting surface 54 of body 12. A second portion 96 of plenum 90 is defined between the upstream portion 78 of peripheral surface 74 of nozzle plate 14 and the inner peripheral surface 52 of body 12.

The volume of plenum 90 may be substantially equal to the desired output volume of molten thermoplastic material dispensed from the fluid discharge passages 100 during a single cycle of the valve (not shown) included in dispenser 16. This may enhance the quality of the pattern of the molten thermoplastic material dispensed onto workpiece 30. For example, stringing of the material may be minimized as compared to that which could otherwise occur if the volume of plenum 90 were significantly greater than the desired output volume, and by avoiding a fluid flow restriction if the volume of plenum 90 were significantly less than the desired output volume.

Nozzle plate 14 may be further secured to body 12 by a plurality of conventional fasteners, such as bolts 97. The hollow interiors 84 of standoffs 82 are aligned with the stepped bores 86 so that fasteners 97 may extend through the stepped bores 86 and the standoffs 82 into body 12. The heads of fasteners 97 may be disposed within a relatively larger diameter portion of stepped bore 86, so that the fastener does not extend below the downstream surface 72 of nozzle plate 14, with the shank of each fastener 97 extending through a relatively smaller diameter portion of the corresponding stepped bore 86.

Nozzle assembly 12 further includes a plurality of peripherally spaced fluid discharge passages 100, with each of the passages 100 defined by one of the grooves 80 of nozzle plate 14 and the inner peripheral surface 52 of body 12. Each of the fluid discharge passages 100 is in fluid communication with the plenum 90 and includes a non-circular outlet 102 extending through the downstream surface 72 of nozzle plate 14. The non-circular outlets 102 are spaced apart from one another in a predetermined pattern, depending upon the desired shape of the area 42 of workpiece 30 surrounded by the unbroken, continuous line 40 of dispensed molten thermoplastic material. The spacing between each pair of outlets 102 is selected to ensure there are no gaps in the line of molten thermoplastic material dispensed onto workpiece 30. If gaps were present, the dispensed line of material would not form a hermetic seal with regard to the area of workpiece 30 surrounded by the line of dispensed material, which is undesirable in various applications. The spacing in a particular application may be dependent upon a variety of parameters, including, but not limited to, temperature and viscosity of the particular material being dispensed, the hydraulic pressure of the material and the cutoff velocity of the dispensed material.

Figure 4A:
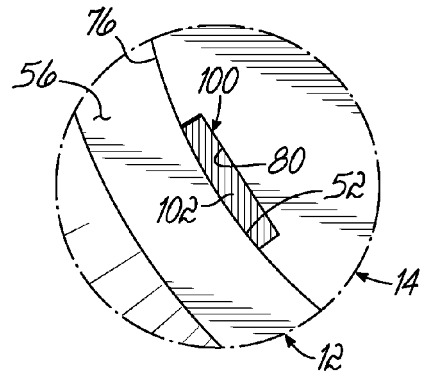
FIG. 4A is an enlarged view of one of the fluid discharge passage outlets shown in FIG. 4.

In the illustrative embodiment of FIGS. 1-4 and 4A, the predetermined pattern of the non-circular outlets is a round pattern, such that area 42 of workpiece 30 has a round shape. Each of the non-circular outlets 102 are slots. The non-circular outlets 102 shown in FIG. 4 are generally rectangular slots as may be appreciated by the enlarged view of one of the slots 102 shown in FIG. 4A. As shown in FIG. 4A of the slots 102 has three linear sides corresponding to the sides of one of the grooves 80 formed in nozzle plate 14, while the other side of each slot 102 is arcuate and corresponds to a portion of the inner peripheral surface 52 of body 12. In other subsequently discussed embodiments of the nozzle assembly of the present invention, each fluid discharge passage 100 may have non-circular outlets 104 that are rectangular slots as shown in the enlarged view illustrated in FIG. 6A and discussed in conjunction with the nozzle assembly shown in FIG. 6. In yet another embodiment, the nozzle assembly of the present invention may include a first plurality of fluid discharge passages 100 having non-circular outlets 102 and a second plurality of fluid discharge passages 100 having non-circular outlets 104.

Nozzle plate 14 may be made from a variety of materials, including but not limited to the following: various tool steels, such as A.I.S.I. Type A-2 tool steel; copper and brass. Tool steels may be advantageously used as they typically have a high purity composition, which is believed to reduce the presence of defects on the downstream surface 72 of nozzle plate 14 and, as a result, to improve the quality of the dispensed streams of molten thermoplastic material. It is also desirable to achieve a relatively smooth surface finish of between 2 micro-inches to 32 micro-inches on the downstream surface 72 of nozzle plate 14 and downstream surface 56 of body 12, in particular in the area surrounding the non-circular outlets 102, to further enhance the quality of the stream of material being dispensed. Very smooth surface finishes such as these may be measured with various equipment, for example, such as profilometers typically used to measure surface finishes down to about 6 micro-inches. For measuring surface finishes lower than 6 micro-inches, laser measuring devices or microscope examination processes may be used. The surface finish may be achieved by conventional means, such as grinding, lapping and/or polishing. Further in this regard, tool steels in particular are resistant to scratching from contact with objects that may be in the environment of nozzle assembly 10. Additionally, the surfaces and edges defining passages 100 and non-circular outlets 102 are substantially free of visible defects, such as scratches, burrs, chamfers, or radii when viewed at a magnification of ten power to further enhance the quality of the dispensed stream of material.

In operation, molten thermoplastic material is supplied to a fluid supply passage 110 of dispenser 16 in a conventional manner. Dispenser 10 includes a valve (not shown) having a stem that may be pneumatically or electrically operated. When the valve is open, such that the valve stem disengages a valve seat 112, molten thermoplastic material flows through the fluid supply passage 110 of dispenser 16 and into the fluid discharge passage 60 of dispenser 16 as shown by flow arrows 114. The molten thermoplastic material, such as a hot melt adhesive, is then supplied to plenum 90 via the fluid supply passage 58 formed in body 12, which communicates with the fluid discharge passage 60 of dispenser 16. After entering plenum 90, the molten thermoplastic material is distributed to the plurality of peripherally spaced fluid discharge passages 100 and is dispensed from the non-circular outlets 102 onto a workpiece such as workpiece 30. The second portion 96 of plenum 90 may gradually decrease in size from the first portion 94 of plenum 90 toward the fluid discharge passages 100 to ensure laminar flow of the thermoplastic material into the discharge passages 100 during operation.

The fluid discharge passage 60 of dispenser 16, and the fluid supply passage 58, plenum 90 and fluid discharge passages 100 of nozzle assembly 10 remain “charged” with molten thermoplastic material between dispensing cycles. Accordingly, when the valve (not shown) of dispenser 16 opens, hydraulic pressure forces the molten thermoplastic material to be dispensed simultaneously through each of the non-circular outlets 102 of fluid discharge passages 100 onto workpiece 30. Since the molten thermoplastic material is dispensed simultaneously through outlets 102, to create the desired pattern of material on workpiece 30, dispenser 16 may be mounted on a stationary device, thereby eliminating the need for a robot. This significantly simplifies the overall dispensing system as compared to conventional systems requiring the use of a dispenser that can be moved as required to create the desired pattern of applied material. The molten thermoplastic material is illustrated in FIG. 1 as a plurality of peripherally spaced streams 106. However, the molten thermoplastic material may be dispensed from nozzle assembly 10 as a plurality of peripherally spaced beads or droplets. Due to the relatively short time period between dispensing cycles, the viscous nature of the molten thermoplastic material prevents the material from leaking out of the outlets 102 between dispensing cycles.

The use of the generally rectangular outlets 102 of fluid discharge passages 100, or the rectangular outlets 104 of fluid discharge passages of subsequently discussed embodiments, reduce the chances of outlet clogging due to charred material that may be in the dispensing system, as compared to systems using round outlets or orifices. Outlets 102 and 104 have an elongate shape, with the longest linear dimension included in these slots being greater than the diameter of a round orifice, for given flow area. Charred material that may be flowing within the dispensing system, typically occurs as elongated charred flakes. Accordingly, the larger linear dimension of the generally rectangular outlets 102 and rectangular outlets 104 may accommodate larger flakes of charred material, as compared to round orifices having the same flow area.

Figure 4B:
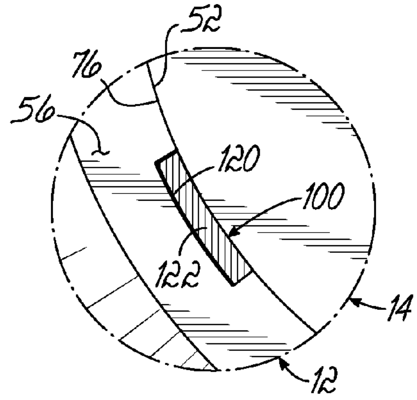
FIG. 4B is an enlarged view of a fluid discharge passage outlet according to another embodiment.

In another embodiment, grooves 80 of nozzle plate 14 are omitted and accordingly, both the downstream portion 76 and upstream portion 78 of peripheral surface 74 of nozzle plate 14 are uninterrupted and continuous around the periphery of nozzle plate 14. In lieu of grooves 80 formed in nozzle plate 14, a plurality of peripherally spaced grooves 120 are formed in body 12 and extend inward from the inner peripheral surface 52 of body 12 as illustrated in FIG. 4B. The downstream portion 76 of the peripheral surface 74 of nozzle plate 14 is disposed in contacting engagement, that may be a press fit, with the inner peripheral surface 52 of body 12 at peripheral locations intermediate grooves 120. Each of the fluid passages 100 includes a generally rectangular outlet 122, similar in shape to previously discussed outlets 102. In this embodiment, the fluid discharge passages 100 are defined by grooves 120 in body 12 and the downstream portion 76 of the peripheral surface 74 of nozzle plate 14. The molten thermoplastic material is discharged from the generally rectangular outlets 122 in the manner discussed previously with regard to the embodiment illustrated in FIGS. 1-4 and 4A.

Figure 5A:
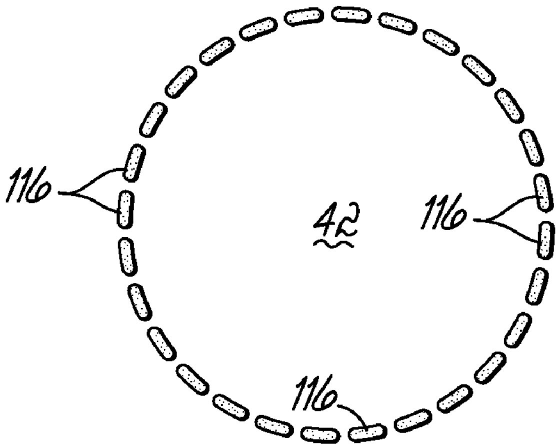
FIGS. 5A-5C are sequential views illustrating a pattern of molten thermoplastic material at different stages during a process of application to a workpiece.
Figure 5B:
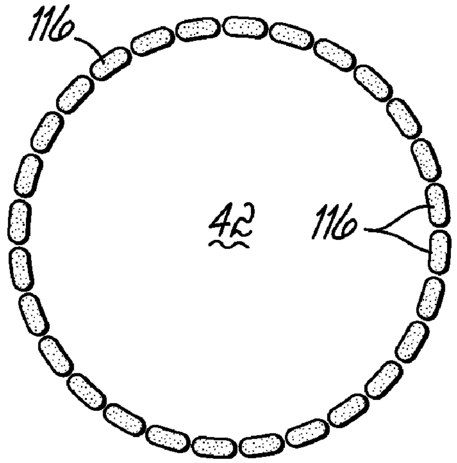
Figure 5C:
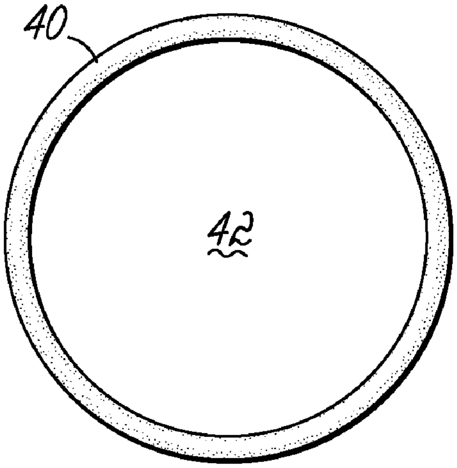

FIG. 5A illustrates a plurality of beads 116 of the molten thermoplastic material, spaced in a round pattern, immediately upon impact with workpiece 30. The hydraulic pressure of the molten thermoplastic material is sufficiently high to cause the material to be dispensed from nozzle assembly 10 with a relatively high velocity causing the beads 116 of molten thermoplastic material to merge together after impacting workpiece 30. FIG. 5B illustrates the beads 116 when they have started to merge together, while FIG. 5C illustrates the continuous, unbroken line 40 of the molten thermoplastic material after the beads 116 have completely merged together with one another. As discussed previously, the unbroken line 40 completely surrounds the area 42 of workpiece 30, with area 42 having a round shape. Accordingly, area 42 of workpiece 30 is sealed from the portion of workpiece 30 exterior of line 40. It may be appreciated that the elapsed time between the impacting beads 114, workpiece 30 and the creation of the continuous, unbroken line 40, is minimal.

Figure 6:
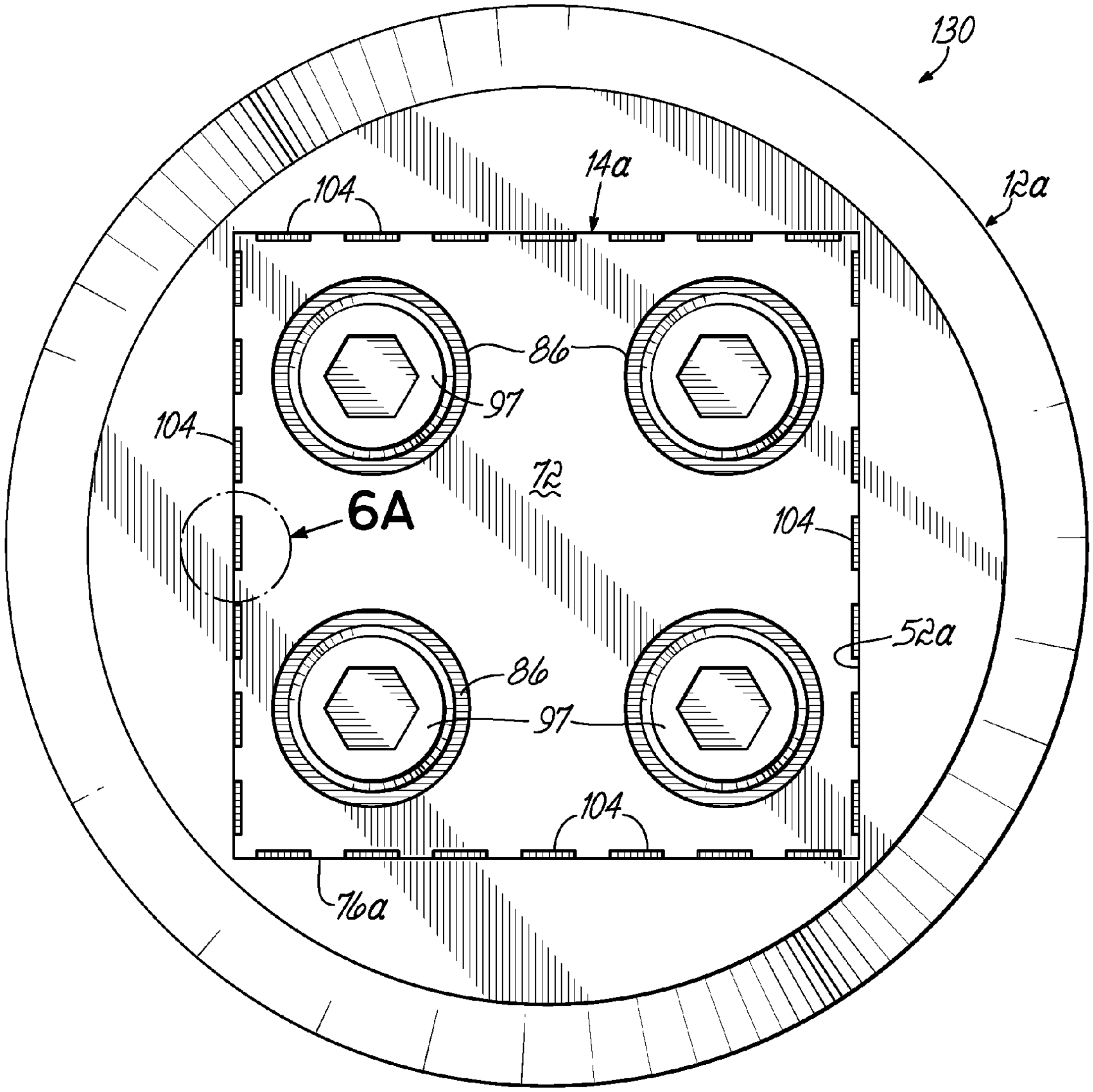
FIG. 6 is a bottom plan view of a nozzle assembly according to another embodiment.
Figure 6A:
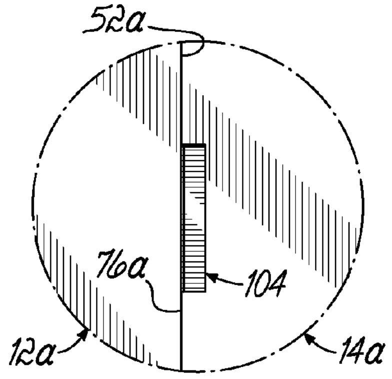
FIG. 6A is an enlarged view of the encircled portion 6A in FIG. 6.

FIG. 6 illustrates a nozzle assembly 130 according to another embodiment. Nozzle assembly 130 includes a body 12*a* and a nozzle plate 14*a* that are the same as body 12 and nozzle plate 14, respectively, with the following exceptions. The recess formed in body 12*a* has a square shape such that the inner peripheral surface of body 12*a*, designated 52*a*, also has a square shape. Similarly, the peripheral surface of nozzle plate 14*a* has a downstream portion, designated 76*a*, that has a square shape and is disposed in contacting engagement, that may be a press fit, with the inner peripheral surface 52*a* of body 12*a*. The fluid discharge passages 100 of nozzle assembly 130 include non-circular outlets that are rectangular slots 104 illustrated in FIG. 6 and in the enlarged view shown in FIG. 6A. As shown in FIG. 6, the rectangular slots 104 are arranged in a square pattern such that nozzle assembly 130 may be used to dispense molten thermoplastic onto a workpiece, such as workpiece 30, to create a square, continuous and unbroken line of molten thermoplastic material on the workpiece 30.

Figure 7:
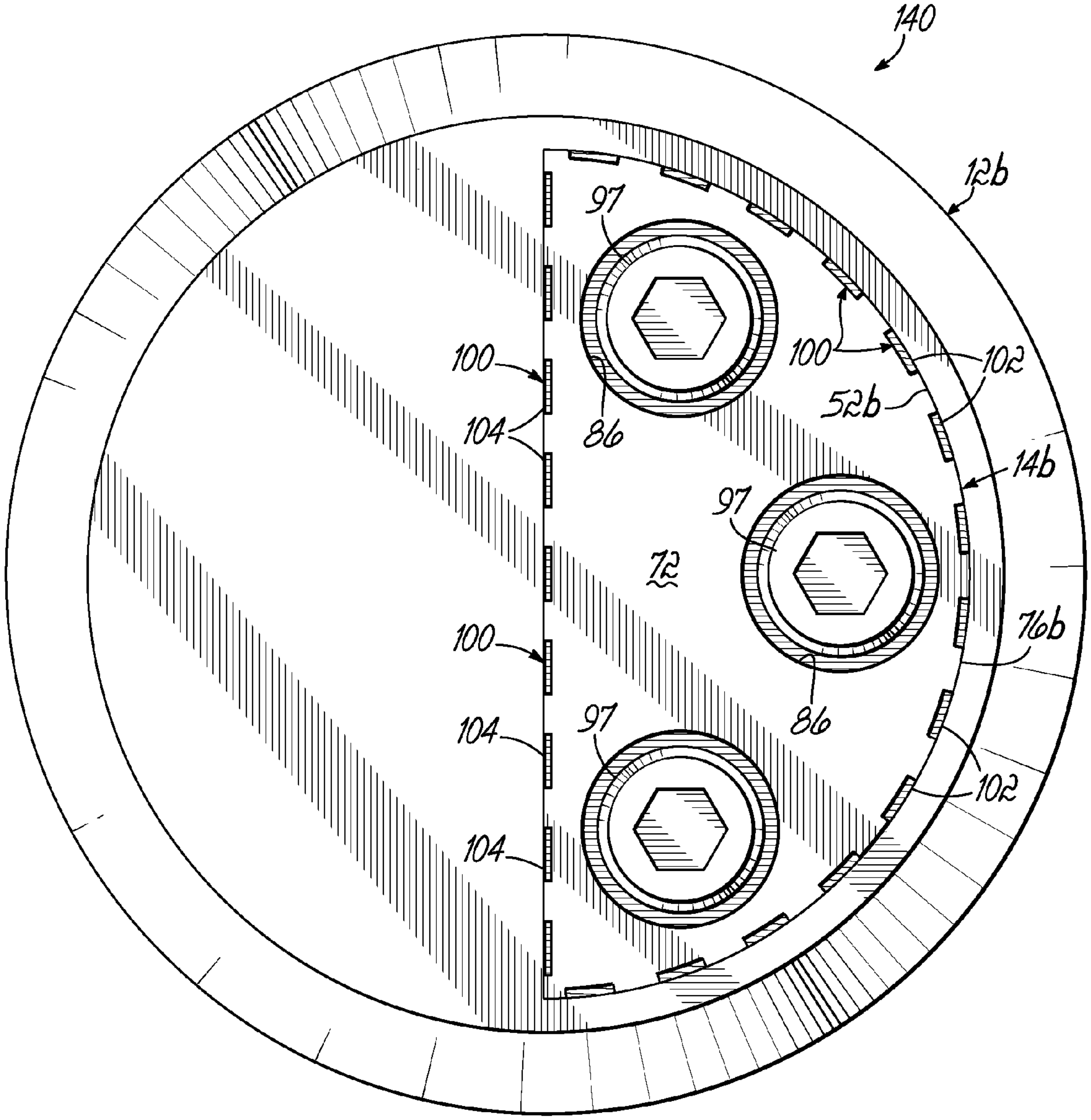
FIG. 7 is a bottom plan view of a nozzle assembly according to another embodiment.

FIG. 7 illustrates nozzle assembly 140 according to another embodiment. Nozzle assembly 140 includes a body 12*b* and a nozzle plate 14*b* that are the same as body 12 and nozzle plate 14, with the following exceptions. Body 12*b* has a D-shaped recess formed therein such that the inner peripheral surface of body 12*b*, designated 52*b*, is D-shaped. A downstream portion 76*b* of the peripheral surface of nozzle plate 14*b*, is also D-shaped and is disposed in contacting engagement, which may be a press fit, with the inner peripheral surface 52*b* of body 12*b*. The non-circular outlets of a first plurality of the fluid discharge passages 100 of nozzle assembly 140 are generally rectangular slots 102 shown in FIG. 7 and in the enlarged view shown in FIG. 4A. The non-circular outlets of a second plurality of the fluid discharge passages 100 of nozzle assembly 140 are rectangular slots 104, shown in FIG. 7 and in the enlarged view shown in FIG. 6A. The generally rectangular slots 102 and the rectangular slots 104, taken together, are arranged in a D-shaped pattern. Accordingly, nozzle assembly 140 may be used to dispense molten thermoplastic material onto a workpiece, such as workpiece 30, to create a D-shaped, continuous, unbroken line of the molten thermoplastic material, completely surrounding a D-shaped area of the workpiece 30.

Figure 8:
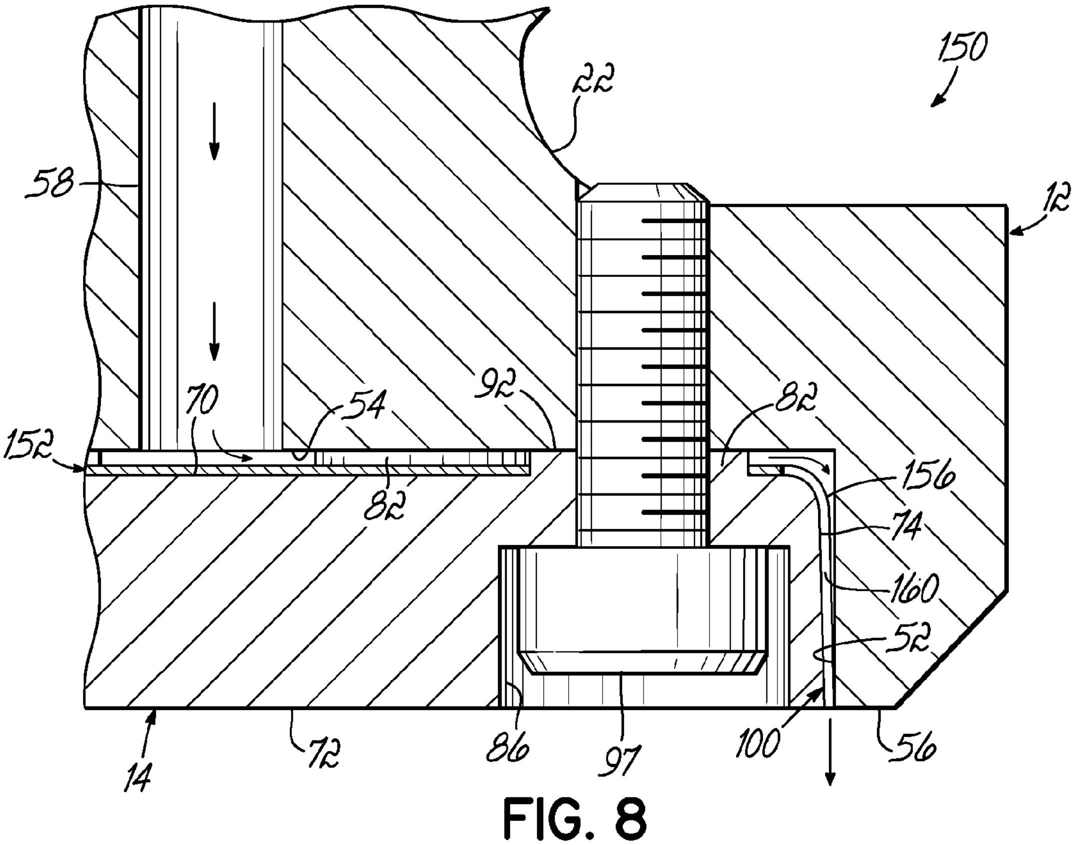
FIG. 8 is a perspective view of a nozzle assembly according to another embodiment.
Figure 9:
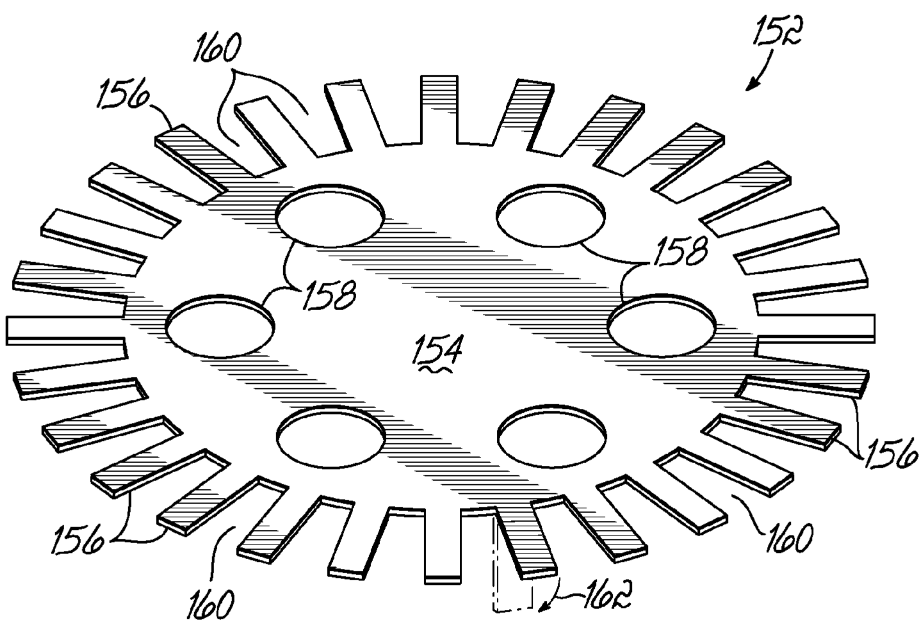
FIG. 9 is a perspective view of a shim plate used in the nozzle assembly shown in FIG. 8.

FIGS. 8 and 9 illustrate a nozzle assembly 150 according to another embodiment. Nozzle assembly 150 is the same as nozzle assembly 10 except that nozzle assembly 150 includes shim plate 152 in addition to body 12 and nozzle plate 14. Shim plate 152 is disposed in plenum 90, between body 12 and nozzle plate 14. Shim plate 152 includes a first, inner portion 154 and a second, outer portion 156 integral with the inner portion 154. Inner portion 154 has a plurality of apertures 158 formed therein to receive the standoffs 82 of nozzle plate 14. The outer portion 156 of shim plate 152 has a plurality of peripherally spaced notches 160 formed therein. The shim plate 152 is initially planar as shown in solid line in FIG. 9, but the outer portion 156 is formed further so that it is non-planar with the inner portion 154, as indicated by arrow 162 and a phantom line portion of outer portion 156 as shown in FIG. 9. After final forming, the outer portion 156 has a shape that is complementary to the shape of the peripheral surface 74 of nozzle plate 14. The inner portion 154 of shim plate 152 is disposed between the upstream surface 70 of nozzle plate 14 and the confronting surface 54 of body 12. The outer portion 156 of shim plate 152 is disposed between the inner peripheral surface 52 of body 12 and the peripheral surface 74 of nozzle plate 14. The fluid discharge passages 100 of nozzle assembly 150 are defined by body 12, nozzle plate 14 and the notches 160 of shim plate 152. The non-circular outlets of fluid discharge passages 100 of nozzle assembly 150 are the generally rectangular slots 102 (not shown in FIG. 9) illustrated and discussed previously with respect to nozzle assembly 10. The molten thermoplastic material is supplied to the fluid discharge passages 100 and dispensed therefrom through the generally rectangular slots 102, in the same manner as discussed previously with respect to nozzle assembly 10.

Figure 10:
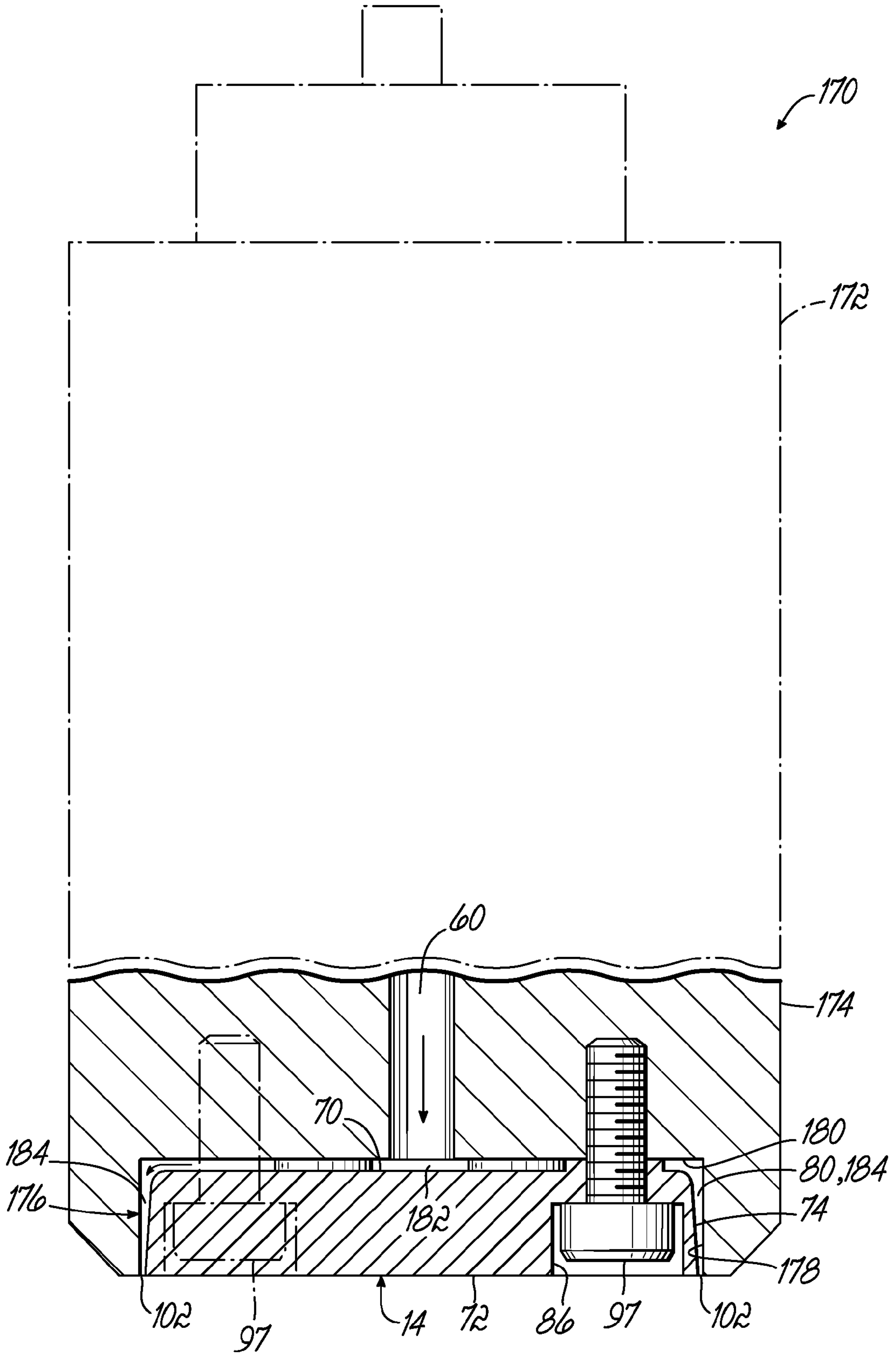
FIG. 10 is a cross-sectional view of an apparatus for dispensing molten thermoplastic material according to another embodiment.

FIG. 10 illustrates an apparatus 170 for dispensing molten thermoplastic material that includes a dispenser 172 and the nozzle plate 14 discussed and illustrated previously with respect to various embodiments of nozzle assemblies described herein, including nozzle assembly 10. Apparatus 170 does not include body 12 of nozzle assembly 10. Instead, the nozzle plate 14 is releasably secured to dispenser 172 with a plurality of fasteners, such as bolts 97. Dispenser 172 may be the same as dispenser 16 discussed previously, except that dispenser 172 has a lower extension portion 174 having a recess 176 formed therein to receive nozzle plate 14. The recess 176 defines an inner peripheral surface 178 and a confronting surface 180 of dispenser 172. Nozzle plate 14 and the extension 174 of dispenser 172 define a plenum 182 therebetween that is in fluid communication with the fluid discharge passage 60 of dispenser 172. The upstream surface 70 of nozzle plate 14 faces the confronting surface 180 of dispenser 172, defining a first portion of plenum 182 therebetween. A second portion of the plenum 182 is defined between the peripheral surface 74 of nozzle plate 14 and the inner peripheral surface 178 of the extension 174 of dispenser 172. The downstream portion 76 of the peripheral surface 74 of nozzle plate 14 is disposed in contacting engagement, which may be a press fit, with the inner peripheral surface 178 of the lower extension 174 of dispenser 172.

Apparatus 170 includes a plurality of peripherally spaced fluid discharge passages 184 that are defined by the grooves 80 of nozzle plate 14 and the inner peripheral surface 178 of dispenser 172. Each of the fluid discharge passages 184 has a non-circular outlet, which is the generally rectangular slot 102 illustrated and discussed previously. The generally rectangular slots 102 are spaced in a circular pattern that may be the same as the pattern shown in FIG. 4 with respect to nozzle assembly 10. Accordingly, apparatus 170 may be used to dispense molten thermoplastic material onto a workpiece, such as workpiece 30, to create a continuous, unbroken line having a circular shape such as line 40 illustrated in FIGS. 1 and 5C. In other embodiments, the recess of the lower extension 174 of dispenser 172 may have any other shape, including but not limited to square, rectangular and D-shapes to receive nozzle plates having complementary shapes, for the purpose of dispensing molten thermoplastic material onto a workpiece to form patterns of the molten thermoplastic material having corresponding shapes. The non-circular outlets of the fluid discharge passages in these embodiments may have the same shape as the generally rectangular slots 102 or the rectangular slots 104, or may include a first plurality of passages having outlets shaped as slots 102 and a second plurality of passages having outlets shaped as slots 104.

Figure 11:
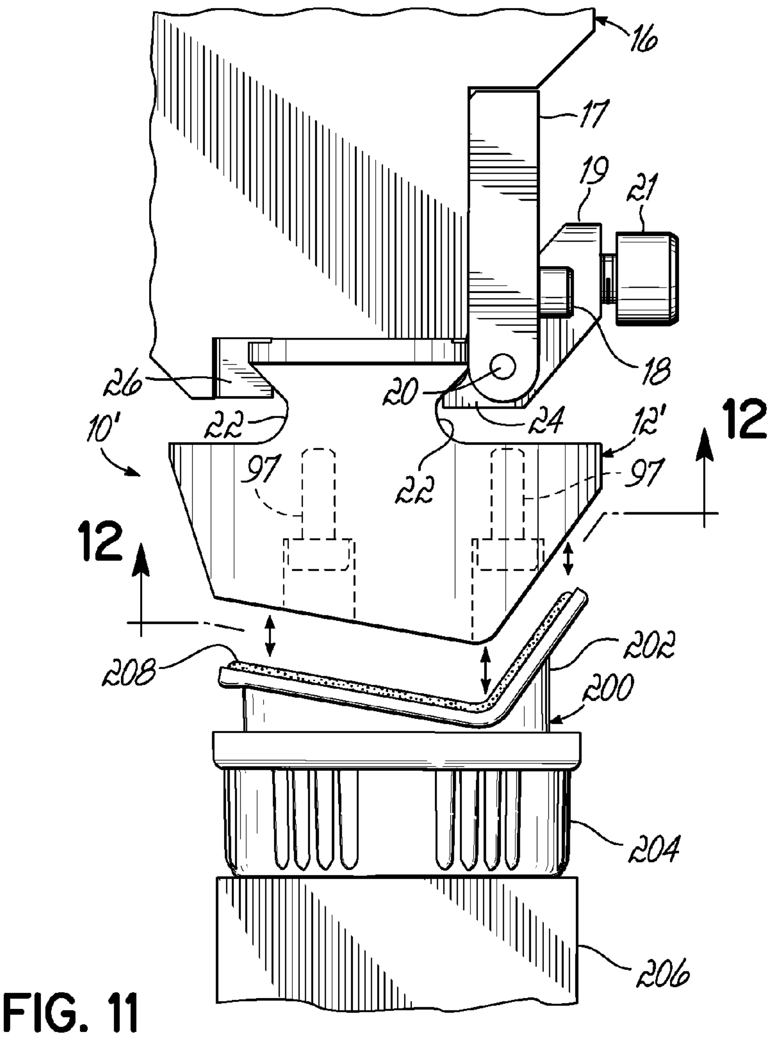
FIG. 11 is an elevational view of a nozzle according to another embodiment releasably mounted to a dispenser of molten thermoplastic material.
Figure 12:
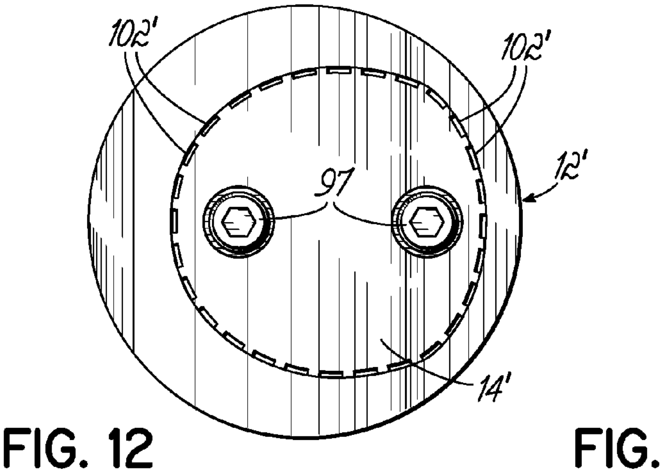
FIG. 12 is a view taken along line 12-12 of FIG. 11.
Figure 13:
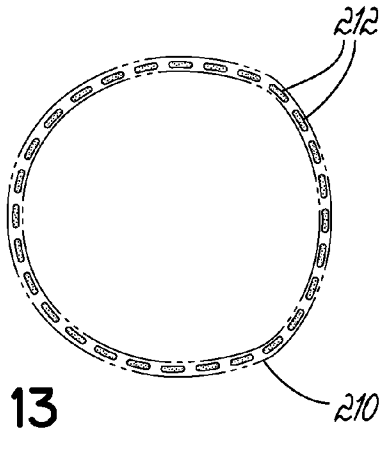
FIG. 13 is a top view of the resulting line of thermoplastic material dispensed by the nozzle of FIGS. 11 and 12.

FIGS. 11 and 12 illustrate another embodiment of a nozzle 10' coupled with a dispenser 16. Nozzle 10' may be generally constructed as discussed in connection with other embodiments, or in other suitable manners. Other elements of the dispenser 16 having like numerals relative to those discussed above are shown but need not be further described as dispenser 16 is constructed as previously described. Nozzle 10' is formed as an assembly including an outer nozzle body 12' and an inner nozzle plate 14'. As in other previously described embodiments, the nozzle body 12' and nozzle plate 14' may act together to define a plurality of outlets 102' (FIG. 12) forming a predetermined, closed geometric shape as desired for the particular pattern of thermoplastic material to be applied. As further shown in FIGS. 11 and 12, the nozzle plate 14' may be secured to the nozzle body 12' by suitable bolts 97. In this embodiment, the thermoplastic material is to be applied to a three-dimensional or multi-planar surface of a cap assembly 200. Cap assembly 200, as shown in FIG. 11, includes a flange 202 and a screw cap 204 suitably supported on a support structure 206 during the adhesive application process. Nozzle 10' is used to apply a continuous line of adhesive or thermoplastic material 208 to an upper perimeter or edge of the flange 202. Thus, a lower surface of the nozzle 10' has a three-dimensional shape that is complimentary to the three-dimensional shape of the flange 202. As illustrated in bottom plan view in FIG. 12, the plurality of outlets 102' follow a three-dimensional or multi-planar path along the multi-planar bottom surface of the nozzle 10', while also producing a closed geometric shape 210 of thermoplastic material or adhesive as shown in the dashed-dot lines of FIG. 13. As with the previous embodiments, the initial shape produced by the discharge of adhesive through the multiple outlets 102' is that of multiple small beads 212 of adhesive or thermoplastic material as shown in FIG. 13. These beads then coalesce or merge into the line 210 of adhesive or thermoplastic material shown in dashed-dot lines in FIG. 13.

While the foregoing description has set forth the preferred embodiments of the present invention in particular detail, it must be understood that numerous modifications, substitutions and changes can be undertaken without departing from the true spirit and scope of the present invention as defined by the ensuing claims. The invention is therefore not limited to specific embodiments as described, but is only limited as defined by the following claims.

What is claimed is:

1. A nozzle for dispensing molten adhesive, the nozzle comprising:

a body including a fluid supply passage and a recess in fluid communication with said fluid supply passage, said fluid supply passage adapted to receive the molten adhesive, said recess defining an inner peripheral surface and a confronting surface;

a nozzle plate disposed within said recess and including an upstream surface, a downstream surface, and a peripheral surface extending between said upstream and downstream surfaces, said upstream surface facing said confronting surface of said body;

a plenum defined by said body and said nozzle plate and including a first portion between said upstream surface of said nozzle plate and said confronting surface of said body, said plenum being in fluid communication with said fluid supply passage;

a plurality of spaced fluid discharge passages, each of said fluid discharge passages being in fluid communication with said plenum and including a non-circular outlet extending through said downstream surface, said non-circular outlets being spaced apart from one another in a predetermined pattern; and a shim plate disposed in said plenum, said shim plate including an inner portion and an outer portion including a plurality of peripherally spaced notches formed therein, said inner portion of said shim plate being disposed between said upstream surface of said nozzle plate and said confronting surface of said body, said outer portion of said shim plate being press fit between said inner peripheral surface of said body and said peripheral surface of said nozzle plate such that said spaced notches define said spaced fluid discharge passages, wherein said peripheral surface of said nozzle plate has a first shape and said inner peripheral surface of said body has a second shape that is complementary to said first shape, and wherein said nozzle plate further comprises a plurality of standoffs extending in an upstream direction from said upstream surface of said nozzle plate, said standoffs being in contacting engagement with said confronting surface of said body, said standoffs establishing a height of said first portion of said plenum.

2. The nozzle of claim 1, wherein said non-circular outlets comprise at least one of the following: a) generally rectangular slots, b) rectangular slots, or c) a combination thereof.

3. The nozzle of claim 1, wherein:

said non-circular outlets further comprise generally rectangular slots; and said predetermined pattern comprises one of the following: a) a pattern with at least one curved side, or b) a pattern with at least one straight side.

4. The nozzle of claim 1, wherein:

said predetermined pattern further comprises a closed geometric shape including at least one curved side; and said non-circular outlets include a plurality of generally rectangular slots for forming the curved side.

5. The nozzle of claim 1, wherein:

said recess is a circular bore formed in said body and extends between a downstream surface of said body and said confronting surface of said body; and said confronting surface is round and said inner peripheral surface of said body is cylindrical.

6. The nozzle of claim 1, wherein said non-circular outlets are contained in a single plane.

7. The nozzle of claim 1, wherein said downstream surface of said nozzle plate defines a three-dimensional configuration such that said non-circular outlets are not coplanar.

8. Apparatus for dispensing molten comprising:

a nozzle as set forth in claim 6; and a dispenser including a dispenser supply passage in fluid communication with the fluid supply passage of the nozzle.

9. A nozzle for dispensing molten adhesive, said nozzle comprising:

a body including a fluid supply passage and a recess in fluid communication with said fluid supply passage, said fluid supply passage adapted to receive the molten adhesive, said recess defining an inner peripheral surface and a confronting surface;

a nozzle plate disposed within said recess and including an upstream surface, a downstream surface, and a peripheral surface extending between said upstream and downstream surfaces, said upstream surface facing said confronting surface of said body;

a plenum defined by said body and said nozzle plate and including a first portion between said upstream surface of said nozzle plate and said confronting surface of said body, said plenum being in fluid communication with said fluid supply passage; and a plurality of spaced fluid discharge passages, each of said fluid discharge passages being in fluid communication with said plenum and including a non-circular outlet extending through said downstream surface, said non-circular outlets being spaced apart from one another in a predetermined pattern, wherein said peripheral surface of said nozzle plate has a first shape and said inner peripheral surface of said body has a second shape that is complementary to said first shape, and said peripheral surface of said nozzle plate engages said inner peripheral surface of said body in a press fit, and wherein said downstream surface of said nozzle plate defines a three-dimensional configuration such that said non-circular outlets are not coplanar.

10. The nozzle of claim 9, wherein said nozzle plate further comprises a plurality of standoffs extending in an upstream direction from said upstream surface of said nozzle plate, said standoffs being in contacting engagement with said confronting surface of said body, said standoffs establishing a height of said first portion of said plenum.

11. The nozzle of claim 9, wherein said non-circular outlets comprise at least one of the following: a) generally rectangular slots, b) rectangular slots, or c) a combination thereof.

12. The nozzle of claim 9, wherein:

said non-circular outlets further comprise generally rectangular slots; and said predetermined pattern comprises one of the following: a) a pattern with at least one curved side, or b) a pattern with at least one straight side.

13. The nozzle of claim 9, wherein:

said predetermined pattern further comprises a closed geometric shape including at least one curved side; and said non-circular outlets include a plurality of generally rectangular slots for forming the curved side.

14. The nozzle of claim 9, wherein:

said recess is a circular bore formed in said body and extends between a downstream surface of said body and said confronting surface of said body; and said confronting surface is round and said inner peripheral surface of said body is cylindrical.

15. The nozzle of claim 9, wherein:

said peripheral surface of said nozzle plate includes a downstream portion and an upstream portion, said downstream portion engaging said inner peripheral surface of said body in a press fit, said upstream portion of said peripheral surface being spaced apart from said inner peripheral surface of said body thereby defining a second portion of said plenum therebetween.

16. The nozzle of claim 15, wherein said second portion of said plenum decreases in size from said first portion of said plenum toward said fluid discharge passages.

17. The nozzle of claim 9, wherein:

said fluid discharge passages are defined by said body and said nozzle plate.

18. The nozzle of claim 17, wherein:

said fluid discharge passages are peripherally spaced;

said nozzle plate further comprises a plurality of peripherally spaced grooves formed therein, said grooves extending inward from said peripheral surface of said nozzle plate; and each of said fluid discharge passages is defined by one of said grooves and said inner peripheral surface of said body.

* * * * *

UNITED STATES PATENT AND TRADEMARK OFFICE

CERTIFICATE OF CORRECTION

PATENT NO. : 8,171,973 B2
APPLICATION NO. : 12/021547
DATED : May 8, 2012
INVENTOR(S) : Charles P. Ganzer et al.

It is certified that error appears in the above-identified patent and that said Letters Patent is hereby corrected as shown below:

Column 11

Claim 8, line 41, after "molten" insert --adhesive--.

Signed and Sealed this
Tenth Day of July, 2012

David J. Kappos
*Director of the United States Patent and Trademark Office*